United States Patent Office 2,904,569
Patented Sept. 15, 1959

2,904,569
HYDROCARBONTIN DERIVATIVES OF MONO-MERCAPTO-BORATE ESTERS

Hugh E. Ramsden, Scotch Plains, N.J., assignor to Metal & Thermit Corporation, New York, N.Y., a corporation of New Jersey No Drawing. Application March 12, 1956
Serial No. 570,664

15 Claims. (Cl. 260—429.7)

This invention relates to organotin derivatives of monomercapto-borate esters, having particular utility as stabilizing agents for resins and the like, and to processes for manufacturing the same.

This application is a continuation-in-part of U.S. application Serial No. 306,071, filed August 23, 1952, and now abandoned.

In accordance with this invention, the new group of compounds may be generally designated as condensation products of organotin compounds with mercapto borate esters. More particularly these compounds are organotin derivatives of a monomercapto borate ester wherein the hydrogens of the mercaptyl groups are replaced by an equivalent number of organotin groups of valence one, two or three, and may be described by the following formula:

(1) $$R_nSn(SR''-OBO_2R'_2)_{4-n}$$
$$x$$

wherein $n$ is 1, 2 or 3; R is an alkyl, cycloalkyl, aryl, alkenyl or aralkyl radical; R'' is a divalent substituted or unsubstituted alkylene or arylene radical, and is the residue of a mercapto alkanol or a mercaptophenol; and R' is an aliphatic hydrocarbon or ether linked hydrocarbon or an aromatic hydrocarbon and is the residue of an alcohol, glycol, polyglycol or phenol. R' may be attached to one or two of the oxygens of the borate radical depending on whether it is monovalent or divalent. $x$ is the valence of R' and has the value 1 or 2. All the valences of Sn, not satisfied by R groups, are joined to S atoms.

Although the structure of compounds comprised within the above formula will differ greatly in detail they will all have in common the grouping:

(2) 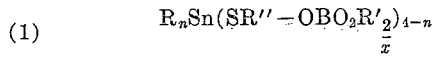

wherein R and R'' have the meanings ascribed to them above. The free bonds on the tin atom may be joined to 1 or 2 additional R radicals, any bonds not not satisfied being joined to other

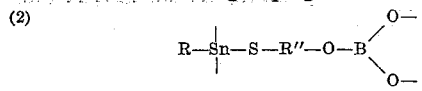

groups. The free bonds on the terminal oxygens may be attached to the same or separate esterifying groups, R', depending upon whether a dihydroxy of a monohydroxy compound was used in the esterification of the boric acid. Variations in R' and R'' cause changes in the physical properties of the finished compound but do not change its essential character. Thus, useful compounds are produced when R' is derived from phenols, glycols, dihydroabietol, hexanol, and other alcohols. Similarly, R'' may be derived from mercapto ethanol, mercapto phenol, substituted mercapto alkanols and mercapto phenols, etc.

The organotin derivatives of monomercapto borate esters of this invention are excellent stabilizers for resins, particularly vinyl chloride containing resins, in quantities as low as one quarter of one percent by weight of the resin. This stabilizing property is equally applicable to rigid plastic formulations and to plasticized compositions.

The organotin derivatives of monomercapto borate esters of the present invention may be prepared in any suitable manner. It has been found however, that these products may be prepared in high yield by reacting an organotin compound with a mercaptoborate ester, and recovering a reaction product having the desired Sn—S linkage and ratio. More specifically, an organotin oxide, hydroxide or organostannoic acid may be condensed with a mercapto-borate ester to produce products having the above formula.

The reaction for the formation of the organotin derivatives of mercapto-borates using organotin oxide may be illustrated by the following equation:

(3) 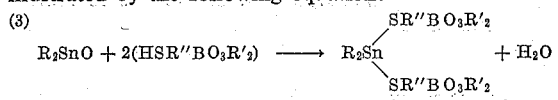

This equation illustrates that the reaction occurs between the mercapto radical and the organotin oxide whereby water splits off and a chemical bond is formed between the tin and the sulfur. It further illustrates the necessity of two molecules of the mercapto compound per mole of tin containing reactant in order to obtain the desired reaction and the desired end product having a 2:1 ratio of sulfur to tin.

When an organotin hydroxide is used, the reaction is similar except that one equivalent of $R_3SnOH$ is reacted with one equivalent of monomercaptoborate ester and a product is produced having a sulfur-tin ratio of 1:1. Products having a sulfur-tin ratio of 3:1 are made by reacting one equivalent of a stannoic acid with three equivalents of monomercapto borate ester. These two reactions may be illustrated by the following equations:

(4) $R_3SnOH + HSR''BO_3R'_2 \rightarrow R_3SnSR''BO_3R'_2 + H_2O$ (5) 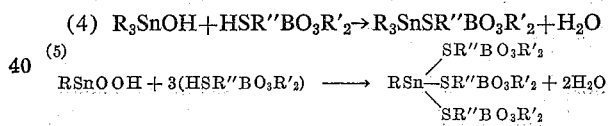

Any suitable reaction temperatures may be employed. It is ordinarily preferred to use temperature slightly in excess of 100° in order to remove the water of reaction as it is produced. However, the reaction can be carried out at lower temperatures and the water removed from the product subsequently by further heating or by other suitable means.

Another embodiment of this invention is the use of inert organic solvents such as toluene, benzene, etc., as the medium for the reaction. The presence of such solvent facilitates the desired reaction. The solvent may be eliminated from the reaction product at the completion of the reaction by any suitable means, for example, by vaporizing the solvent under vacuum at elevated temperatures.

According to the procedure of this invention, these organotin derivatives of monomercaptoborate esters can be obtained in high yields. It is unnecessary to use an excess of either reactant, the total amount of starting materials being substantially completely utilized in the formation of the final reaction product. Consequently we prefer to use stoichiometric amounts of the reactants, although the use of an excess of either reactant is not prohibited.

The aforesaid organotin derivatives are useful as stabilizers for chlorinated compositions such as chlorine-containing plastics. Their use as rubber accelerators, rubber antioxidants, polymerization accelerators, and petroleum additives is also suggested.

The following examples are further illustrative of these organotin derivatives of monomercapto borate esters and their preparation, and it will be understood that the invention is not limited thereto.

EXAMPLE I 332 grams Abitol (85% dihydroabietyl alcohols (1 mole), 39 gms. mercaptoethanol (0.5 mole), 31 gms. boric acid (0.5 mole), and 100 ml. of toluene are stirred and heated under reflux until all of the water of reaction is removed. The mixture is cooled and subsequently subjected to a downward vacuum distillation to remove the toluene. Stripping the reaction product of the toluene is continued to a final pot temperature of 183° C. and a pressure of 15 mm. Hg. The residue, bis(dihydroabietyl) mercaptoethyl borate, is an extremely viscous, light colored liquid having the following analysis:

Sulfur—4.5%, boron—2.1%

33.1 gms. dibutyltin oxide (0.133 mole), 199.4 gms. bis(dihydroabietyl) mercaptoethyl borate (0.266 mole), and 100 ml. of toluene are stirred and heated under reflux in order to remove the water of reaction. The resulting mixture is subjected to a downward vacuum distillation to effect removal of the toluene. The final pot temperature is 215° C. at 13 mm. Hg. pressure. The residue, dibutyltin di(bisdihydroabietyl mercaptoethyl borate), a viscous light colored liquid, weighed 228 gms. and has the following analysis:

| | Percent |
|---|---|
| Sulfur | 4.5 |
| Tin | 6.9 |
| Boron | 2.7 |

EXAMPLE II

Ten moles of 2-ethylhexanol, 5 moles of β-mercaptoethanol, 5 moles of boric acid, and 200 ml. of toluene are heated in a 5-liter flask equipped with a vigorous stirrer, water separator, reflux condenser, and thermometer. Heating at reflux is continued until the requisite water of reaction (15 moles) is removed. Then dibutyltin oxide (2.5 moles) is added and heating at reflux is continued until 2.5 moles of water is removed. The mixture is cooled, filtered and stripped under vacuum to remove the toluene. A clear, slightly yellow, viscous liquid, dibutyltin bis (di-2-ethylhexyl β-mercaptoethyl borate), results, weighing 2265 grams, and having the following analysis Sn, 12.8%; S, 6.4%; B, 2.3%.

EXAMPLE III

Two moles of 2-butyloctanol, 1 mole of β-mercaptoethanol, 1 mole of boric acid, and 100 ml. of toluene were heated at reflux and stirred until 3 moles of water distilled out of the mixture. One-half mole of dibutyltin oxide was then added, and refluxing was continued until ½ mole of water was removed. The mixture was cooled, filtered and stripped of solvent under vacuum to yield a light yellow slightly opaque liquid, dibutyltin bis(di-2-butyloctyl-β-mercaptoethyl borate) which contained 10.3% Sn and 5.75% S.

EXAMPLE IV

Two moles of ethylene glycol, 2 moles of β-mercaptoethanol, 2 moles of boric acid, and 200 ml. of toluene were stirred and heated under reflux until 6 moles of water had distilled out. Then 1 mole of dibutyltin oxide was added and heating was continued until 1 mole of water of reaction was removed. Solvent was then removed by vacuum stripping. The final product was a very viscous liquid of the following formula:

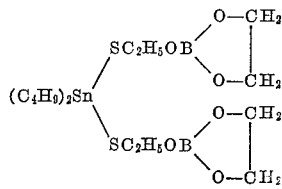

EXAMPLE V

Two moles of phenol, one mole of β-mercaptoethanol, one mole of boric acid, and 100 ml. of toluene are stirred and heated under reflux until 3 moles of water of reaction are removed. One mole of diphenyltin oxide is then added, and heating is continued until one mole of water has been removed. The mixture is then filtered and vacuum stripped to yield a light amber colored viscous liquid, diphenyltin bis(diphenyl-β-mercaptoethyl borate).

EXAMPLE VI

By the process of Example II, 6 moles of butyl alcohol, 3 moles of 4-mercaptobutanol, 3 moles or boric acid are reacted and then one mole of n-octylstannoic acid is added to yield finally n-octyltin tris [-S-(4-mercaptobutyl dibutyl borate)].

EXAMPLE VII

By the process of Example VI, methylstannoic acid, 2 mercaptocyclohexanol, decyl alcohol (commercial mixture), and boric acid yield methyltin tris [S-(2-mercaptocyclohexyl didecyl borate)].

EXAMPLE VIII

Similarly to Example VI, p-tolylstannoic acid, β-mercaptoethanol, benzyl alcohol, and boric acid yield p-tolyltin tris [-S-(β-mercaptoethyl dibenzyl borate)].

EXAMPLE IX

By the process of Example VI, benzylstannoic acid, omega-mercaptodecanol-1, 2-ethylbutanol-1, and boric acid yield benzyltin tris [S-(omega-mercaptodecyl-2-ethylbutyl borate)].

EXAMPLE X

One mole of trivinyltin hydroxide and one mole of β-mercaptoethyl bis-(dihydroabietyl) borate, by the process of Example I, yield trivinyltin S-β-mercaptoethyl bis-(dihydroabietyl) borate.

EXAMPLE XI

One mole of tribenzyltin hydroxide and one mole of p-mercaptophenyl di(p-cresyl) borate (from p-mercaptophenyl, p-cresol, and boric acid) yield tribenzyltin S-p-mercaptophenyl di(p-cresyl) borate.

EXAMPLE XII

By the process of Example IV, one mole of pentamethylene glycol, one mole of boric acid, one mole of β-mercaptoethanol, and finally one mole of triethyltin hydroxide yield triethyltin S-β-mercaptoethyl pentamethylene borate, a very viscous material.

EXAMPLE XIII

By the process of Example I, p-mercaptobenzyl-alcohol, cyclohexanol, boric acid, and triphenyltin hydroxide yield triphenyltin p-mercaptobenzyl dicyclohexyl borate.

EXAMPLE XIV

By the process of Example IV, one mole of diethylene glycol, one mole of boric acid, one mole of β-mercaptoethanol, and finally one mole of triethyltin hydroxide yield triethyltin S-β-mercaptoethyl diethyleneglycol borate.

It has also been discovered, and is a feature of this invention, that the organotin derivatives of monomercapto-borate esters of this invention function as excellent stabilizers for resin compositions, particularly resin compositions containing vinyl chloride and plasticizers, and when intimately dispersed therein, will provide plastic compositions of improved resistance to heat deterioration. Stable thermoplastic compositions containing copolymers and vinylidene dichloride polymers are also obtainable with the use of the present mercapto-borate esters. Excellent films are obtained from the aforesaid plastic compositions which exhibit a high degree of stability. The optimum concentration of the aforesaid organotin derivatives, useful as a stabilizer is about 2% based on the weight of the vinyl resin. The resin composition containing this concentration of stabilizer produces a stable plastic film which resists darkening at elevated temperatures as evidenced by the results of the heat tests in Table I.

The vinyl resins employed were polyvinyl chloride resins. The stabilizer was incorporated into a mixture of 100 parts by weight of resin and 50 parts by weight of di-2-ethylhexyl phthalate plasticizer.

This mixture was milled for 5 minutes on a two-roll differential speed mill at 320–25° F., being removed as a sheet. Portions of the sheet were placed in a single cavity mold (6" x 6" x 40 mils) preheated to 275° F. The mold was placed on a press and raised to 320° F., the pressure was raised to 40,000 pounds and held until the temperature reached 330° F. This process required 5 to 5.5 minutes. The pressed molded sheet was removed, cooled and cut into strips, 1" x 6". These strips were hung vertically and heat aged in a circulating air oven at 320° F. for 1 hour, 2 hours, 3 hours and 4 hours. Samples were rated visually, the degree of stability of the vinyl chloride resin film being represented by the depth of colorations.

*Table I*

APPEARANCE AFTER HEAT AGING

| Stabilizer | 1 Hr. | 2 Hrs. | 3 Hrs. | 4 Hrs. |
| --- | --- | --- | --- | --- |
| None | Red Brown | Black | | |
| Example I | Colorless | Colorless | Brown | Brown. |
| Example II | do | do | Colorless | Slight yellow. |
| Example III | do | do | do | Do. |
| Example IV | do | do | do | Do. |

This table clearly discloses the unusual stabilizing activity of these organotin derivatives of monomercaptoborate esters in comparison to a resin without such stabilizer.

While the invention has been described with reference to various examples and embodiments, it will be apparent to those skilled in the art that various modifications may be made and equivalents substituted therefor, without departing from the principles and true nature of the present invention.

I claim:

1. Hydrocarbontin derivatives of monomercapto borate ester having the formula

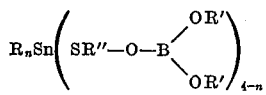

wherein $n$ has a value from 1 to 3, R is a monovalent hydrocarbon radical, R" is a divalent hydrocarbon radical and R' is selected from the group consisting of hydrocarbon radicals and linked hydrocarbon radicals wherein the two R's may be joined together to form a cyclic structure.

2. A hydrocarbontin monomercaptoborate according to claim 1 wherein $n$ is 1 and R' is hydrocarbon.

3. A hydrocarbontin monomercaptoborate according to claim 1 wherein $n$ is 2 and R' is hydrocarbon.

4. A hydrocarbontin monomecaptoborate according to claim 1 wherein $n$ is 3 and R' is hydrocarbon radical.

5. A method of preparing a hydrocarbon derivative of monomercaptoborate ester which comprises reacting a hydrocarbontin compound selected from the class consisting of hydrocarbontin oxides, hydrocarbontin hydroxides and hydrocarbon-stannoic acids with a monomercapto borate ester of formula

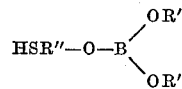

wherein R" is a divalent hydrocarbon radical and R' is selected from the class consisting of monovalent and divalent hydrocarbon radicals and ether linked hydrocarbon radicals, wherein when R' is a divalent radical the free valence bonds of each R' group is joined together to form a cyclic structure.

6. A process according to claim 5, wherein the reaction is carried out in the presence of an inert organic solvent as a reaction medium.

7. A process according to claim 5 wherein about stoichiometric amounts of reactants are employed.

8. A method according to claim 5, wherein said hydrocarbontin compound is a hydrocarbontin oxide and R' is hydrocarbon.

9. A method according to claim 5, wherein said hydrocarbontin compound is a hydrocarbontin hydroxide and R' is hydrocarbon.

10. A method according to claim 5, wherein said hydrocarbontin compound is a hydrocarbon-stannoic acid and R' is hydrocarbon.

11. A method according to claim 5, wherein the divalent hydrocarbon radical represented by R" is selected from the group consisting of alkylene, cycloalkylene, arylene and aralkylene radicals.

12. A method of preparing a hydrocarbontin derivative of a monomercapto borate ester which comprises reacting a compound selected from the group consisting of hydrocarbon alcohols and ether linked hydrocarbon alcohols with a monomercaptohydrocarbon alcohol and boric acid and subsequently reacting the product of this reaction with a hydrocarbontin compound selected from the group consisting of hydrocarbontin oxide, hydrocarbontin hydroxides, and hydrocarbon-stannoic acids.

13. A method according to claim 12, wherein a monomercaptoborate ester product of the first reaction is separated from the reaction mixture and this is subsequently reacted with said hydrocarbontin compound.

14. A method according to claim 12, wherein said hydrocarbontin compound is added directly to the reaction mixture of the first reaction.

15. A hydrocarbon monomercaptoborate according to claim 1 wherein R is a radical selected from the class consisting of alkyl, phenyl, and benzyl radicals, R' is an alkyl radical, and R" is an alkylene radical.

References Cited in the file of this patent

UNITED STATES PATENTS

| | | |
| --- | --- | --- |
| 2,312,208 | Clayton et al. | Feb. 23, 1943 |
| 2,484,508 | Hill | Oct. 11, 1949 |
| 2,636,891 | Gregory | Apr. 28, 1953 |
| 2,648,650 | Weinberg et al. | Aug. 11, 1953 |
| 2,746,946 | Weinberg et al. | May 22, 1956 |